United States Patent
Asano et al.

(10) Patent No.: US 11,271,197 B2
(45) Date of Patent: *Mar. 8, 2022

(54) NEGATIVE ELECTRODE MATERIAL FOR NON-AQUEOUS ELECTROLYTE SECONDARY BATTERY AND NON-AQUEOUS ELECTROLYTE SECONDARY BATTERY

(71) Applicant: Panasonic Intellectual Property Management Co., Ltd., Osaka (JP)

(72) Inventors: Taisuke Asano, Hyogo (JP); Yohei Uchiyama, Hyogo (JP); Taisuke Yamamoto, Nara (JP); Tatsuya Akira, Osaka (JP); Norihisa Yamamoto, Osaka (JP); Hiroshi Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 223 days.

This patent is subject to a terminal disclaimer.

(21) Appl. No.: 16/497,609

(22) PCT Filed: Feb. 16, 2018

(86) PCT No.: PCT/JP2018/005423
§ 371 (c)(1),
(2) Date: Sep. 25, 2019

(87) PCT Pub. No.: WO2018/179969
PCT Pub. Date: Oct. 4, 2018

(65) Prior Publication Data
US 2020/0020932 A1 Jan. 16, 2020

(30) Foreign Application Priority Data
Mar. 29, 2017 (JP) .............................. JP2017-066340

(51) Int. Cl.
*H01B 1/18* (2006.01)
*H01M 4/36* (2006.01)
(Continued)

(52) U.S. Cl.
CPC .............. *H01M 4/364* (2013.01); *H01B 1/18* (2013.01); *H01M 4/386* (2013.01); *H01M 4/483* (2013.01);
(Continued)

(58) Field of Classification Search
CPC .............. H01B 1/04; H01B 1/08; H01B 1/18; H01M 4/36; H01M 4/38; H01M 4/58
See application file for complete search history.

(56) References Cited

U.S. PATENT DOCUMENTS

2009/0162750 A1  6/2009 Kawakami et al.
2012/0258370 A1  10/2012 Miyoshi et al.
(Continued)

FOREIGN PATENT DOCUMENTS

JP   2009-164104 A   7/2009
JP   2014-107013 A   6/2014
(Continued)

OTHER PUBLICATIONS

International Search Report dated May 22, 2018, issued in counterpart Application No. PCT/JP2018/005423 (2 pages).

*Primary Examiner* — Mark Kopec
(74) *Attorney, Agent, or Firm* — Westerman, Hattori, Daniels & Adrian, LLP

(57) ABSTRACT

Disclosed is a negative electrode material for a non-aqueous electrolyte secondary battery, including: a lithium silicate phase; silicon particles dispersed in the lithium silicate phase; and at least one element Me dispersed in the lithium silicate phase, and selected from the group consisting of a rare-earth element and an alkaline-earth metal. The compo-
(Continued)

sition of the lithium silicate phase is represented, for example, by the formula: $Li_{2z}SiO_{2+z}$, and satisfies $0<z<2$, and the element Me is dispersed in the lithium silicate phase, for example, as an Me oxide.

8 Claims, 2 Drawing Sheets

(51) Int. Cl.
*H01M 4/38* (2006.01)
*H01M 4/48* (2010.01)
*H01M 4/58* (2010.01)
*H01M 10/0525* (2010.01)
*H01M 4/02* (2006.01)

(52) U.S. Cl.
CPC ..... *H01M 4/5825* (2013.01); *H01M 10/0525* (2013.01); *H01M 2004/027* (2013.01)

(56) References Cited

U.S. PATENT DOCUMENTS

| | | | |
|---|---|---|---|
| 2015/0079471 A1* | 3/2015 | Fang | H01M 4/505 |
| | | | 429/219 |
| 2015/0325839 A1 | 11/2015 | Put et al. | |
| 2016/0322637 A1 | 11/2016 | Nakanishi et al. | |
| 2016/0372753 A1 | 12/2016 | Fukasawa et al. | |
| 2017/0309950 A1 | 10/2017 | Minami et al. | |
| 2020/0365879 A1* | 11/2020 | Yamamoto | H01M 4/364 |
| 2021/0066716 A1* | 3/2021 | Uchiyama | H01M 4/134 |

FOREIGN PATENT DOCUMENTS

| | | |
|---|---|---|
| JP | 2016-507859 A | 3/2016 |
| WO | 2011/077654 A1 | 6/2011 |
| WO | 2015/097990 A1 | 7/2015 |
| WO | 2015/145521 A1 | 10/2015 |
| WO | 2016/136180 A1 | 9/2016 |

* cited by examiner

NEGATIVE ELECTRODE MATERIAL FOR NON-AQUEOUS ELECTROLYTE SECONDARY BATTERY AND NON-AQUEOUS ELECTROLYTE SECONDARY BATTERY

TECHNICAL FIELD

The present invention relates mainly to an improvement of a negative electrode of a non-aqueous electrolyte secondary battery.

BACKGROUND ART

Non-aqueous electrolyte secondary batteries, in particular, lithium ion secondary batteries have a high voltage and a high energy density, and thus are attracting attention as the power sources for compact consumer devices, power storage apparatuses, and electric vehicles. With an increasing need for higher energy density for the batteries, materials containing silicon, which can form an alloy with lithium, are expected to be used as negative electrode active materials having a high theoretical capacity density.

PTL 1 proposes improving the cycle characteristics of a non-aqueous electrolyte secondary battery by dispersing a lithium compound and a metal compound other than a silicon oxide in a lithium silicate phase in a negative electrode active material for a non-aqueous electrolyte secondary battery, including a lithium silicate phase represented by $Li_{2z}SiO_{2+z}$ (0<z<2), and silicon particles dispersed in the lithium silicate phase.

CITATION LIST

Patent Literature

[PTL 1] WO 2016/136180

SUMMARY OF INVENTION

In the case of dispersing silicon particles in a lithium silicate phase, cracking tends to occur in the matrix of the lithium silicate phase around the silicon particles during charge/discharge. The occurrence of cracking in the matrix reduces the current collecting efficiency of the negative electrode, and promotes a side reaction, thus reducing the cycle characteristics. When a metal compound such as a zirconium oxide is dispersed in a lithium silicate phase as in PTL 1, the lithium silicate phase becomes firm, and the cracking of the matrix is suppressed, but not to a sufficient degree. Even a minute crack can cause a side reaction to proceed, and it is therefore difficult to suppress the generation of gas.

In view of the foregoing, an aspect of the present disclosure relates to a negative electrode material for a non-aqueous electrolyte secondary battery, including: a lithium silicate phase; silicon particles dispersed in the lithium silicate phase; and at least one element Me dispersed in the lithium silicate phase, and selected from the group consisting of a rare-earth element and an alkaline-earth metal.

Another aspect of the present disclosure relates to a non-aqueous electrolyte secondary battery including: a negative electrode including the above-described negative electrode material for a non-aqueous electrolyte secondary battery; a positive electrode capable of electrochemically absorbing and desorbing lithium; and a non-aqueous electrolyte.

With the negative electrode material for a non-aqueous electrolyte secondary battery according to the present disclosure, it is possible to suppress the gas generation caused by a side reaction between a non-aqueous electrolyte and a negative electrode material.

DESCRIPTION OF EMBODIMENT

Figure 1:
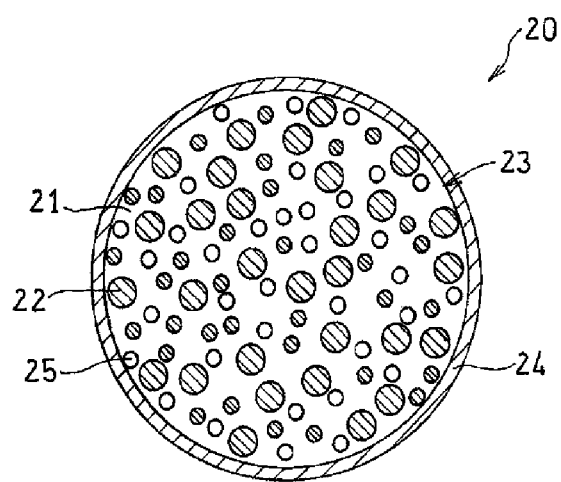
FIG. 1 is a schematic cross-sectional view showing the configuration of an LSX particle according to an embodiment of the present invention.

A negative electrode material for a non-aqueous electrolyte secondary battery (hereinafter also referred to as "negative electrode material LSX") according to an embodiment of the present invention includes a lithium silicate phase, silicon particles dispersed in the lithium silicate phase, and at least one element Me dispersed in the lithium silicate phase, and selected from the group consisting of a rare-earth element and an alkaline-earth metal.

A lithium silicate phase has a smaller number of sites that can react with lithium, as compared with $SiO_x$, which is a composite of $SiO_2$ and fine silicon, and thus is less prone to cause an irreversible capacity due to charge/discharge. In the case of dispersing silicon particles in a lithium silicate phase, an excellent charging/discharging efficiency can be achieved at the initial period of charge/discharge. In addition, the content of the silicon particles can be freely changed, and it is thus possible to design a negative electrode having a high capacity.

The crystallite size of the silicon particles dispersed in the lithium silicate phase is, for example, 10 nm or more. The silicon particles have a particulate phase of a simple substance of silicon (Si). When the crystallite size of the silicon particles is 10 nm or more, the surface area of the silicon particles can be kept small, and therefore the degradation of the silicon particles, which is accompanied by the generation of an irreversible capacity, is less likely to occur. The crystallite size of the silicon particles is calculated from the half-width of a diffraction peak attributed to the Si (111) plane in an X-ray diffraction (XRD) pattern of the silicon particles, using the Scherrer equation.

Note that $SiO_x$ is a composite of $SiO_2$ and fine silicon having a crystallite size of about 5 nm, and contains a large amount of $SiO_2$. Accordingly, for example, the following reaction occurs during charge/discharge.

$$SiO_x(2Si+2SiO_2)+16Li^++16e^- \rightarrow 3Li_4Si+Li_4SiO_4 \quad (1)$$

Resolving the formula (1) for Si and $2SiO_2$ results in the following formulas:

$$Si+4Li^++4e^- \rightarrow Li_4Si \quad (2)$$

$$2SiO_2+8Li^++8e^- \rightarrow Li_4Si+Li_4SiO_4 \quad (3)$$

The reaction of $SiO_2$ in the formula (3) is an irreversible reaction, and the production of $Li_4SiO_4$ can be a main cause of a reduced initial charging/discharging efficiency.

The negative electrode material LSX is also excellent in structural stability. The reason is that the expansion and contraction of the negative electrode material LSX due to charge/discharge is suppressed since the silicon particles are dispersed in the lithium silicate phase. From the viewpoint of suppressing the cracking of the silicon particles, the silicon particles have an average particle size of preferably 500 nm or less, more preferably 200 nm or less, and further preferably 50 nm or less, before initial charging. After initial charging, the silicon particles have an average particle size of preferably 400 nm or less, more preferably 100 nm or less. By refining the silicon particles, the volume change during charge/discharge is reduced, and the structural stability of the negative electrode material LSX is further improved.

The average particle size of the silicon particles is measured by observing a cross-sectional SEM (Scanning Electron Microscope) photograph of the negative electrode material LSX. Specifically, the average particle size of the silicon particles is determined by averaging the maximum diameters of arbitrarily selected 100 silicon particles. The silicon particles are formed by a plurality of crystallites gathering together.

From the viewpoint of increasing the capacity and improving the cycle characteristics, the content, as measured by Si-NMR, of the silicon particles (simple substance of Si) in the negative electrode material LSX is preferably 20 mass % to 95 mass %, more preferably 35 mass % to 75 mass %. In this case, the diffusion of lithium ion becomes favorable, making it possible to easily achieve excellent load characteristics. In addition, the surface of the silicon particles that is exposed without being covered by the lithium silicate phase is reduced, suppressing a side reaction between the non-aqueous electrolyte and the silicon particles.

In the following, desirable measurement conditions for Si-NMR will be described.

Measurement apparatus: a solid-state nuclear magnetic resonance spectrometer (INOVA-400), manufactured by Varian Inc.

Probe: Varian 7 mm CPMAS-2
MAS: 4.2 kHz
MAS rate: 4 kHz
Pulse: DD (45° pulse+signal acquisition time 1H decoupling)
Repetition time: 1200 sec
Observation width: 100 kHz
Center of observation: approximately −100 ppm
Signal acquisition time: 0.05 sec
Number of times of integrations: 560
Sample amount: 207.6 mg When the composition of the lithium silicate phase is represented by the formula: $Li_{2z}SiO_{2+z}$, it is preferable that $0<z<2$ is satisfied. The formula: $Li_{2z}SiO_{2+z}$ can also be represented as $Li_{2z}SiO_2 \cdot O_z$ or $(Li_2O)_z \cdot SiO_2$, and it can be considered that z mol of the $Li_2O$ component (alkali component) is contained per mol of the $SiO_2$ component. The smaller the ratio of the $Li_2O$ component, the more the dissolution of the alkali component can be suppressed, and the more the stability of the negative electrode material LSX can be improved. It is preferable that the above formula satisfies $0<z<1$.

For example, preferably 50 mass % or more, more preferably 60 mass % or more of the lithium silicate phase is constituted by lithium silicate that satisfies $0<z<\frac{1}{2}$. In this case, the contents of $Li_4SiO_4$ ($z=2$) and $Li_2SiO_3$ ($z=1$), which are prone to cause dissolution of an alkali component that may be contained in the lithium silicate phase, are reduced. The content of $Li_2Si_2O_5$ in the lithium silicate phase, as measured by Si-NMR, is preferably greater than 15 mass %, more preferably 40 mass % or more.

The composition of the lithium silicate phase can be analyzed in the following manner.

First, the mass of a sample of the negative electrode material LSX is measured. Thereafter, the contents of carbon, lithium, and oxygen that are contained in the sample are calculated in the following manner. Next, the carbon content is subtracted from the mass of the sample, the lithium content and the oxygen content in the remaining amount are calculated, and the x value is determined from the molar ratio of lithium (Li) and oxygen (O).

The carbon content is measured using a carbon-sulfur analyzer (e.g., EMIA-520 manufactured by HORIBA, Ltd.). A measured amount of the sample is placed on a magnetic board, to which a combustion assistant is then added, and the magnetic board is inserted in a combustion furnace (carrier gas: oxygen) heated to 1350° C., and the amount of the carbon dioxide gas generated during combustion is detected by infrared absorption. A calibration curve is formed using, for example, carbon steel (carbon content: 0.49%) manufactured by Bureau of Analysed Sample. Ltd., and the carbon content of the sample is calculated (high-frequency induction heating furnace combustion-infrared absorption method).

The oxygen content is measured using an oxygen-nitrogen-hydrogen analyzer (e.g., EGMA-830 manufactured by HORIBA, Ltd.). The sample is placed in a Ni capsule, which is then introduced, together with a Sn pellet and a Ni pellet that will form flux, into a carbon crucible heated with a power of 5.75 kW, and the carbon monoxide gas released is detected. A calibration curve is formed using a standard sample $Y_2O_3$, and the oxygen content of the sample is calculated (inert gas fusion-nondispersive infrared absorption method).

The lithium content is measured by entirely dissolving the sample in hot hydrofluoric-nitric acid (a heated acid mixture of hydrofluoric acid and nitric acid), and removing the carbon in the dissolution residue by filtration, followed by analyzing the resulting filtrate by inductively coupled plasma emission spectrometry (ICP-AES). A calibration curve is formed using a commercially available standard solution of lithium, and the lithium content of the sample is calculated.

At least one element Me selected from the group consisting of a rare-earth element and an alkaline-earth metal is dispersed in the lithium silicate phase. In the lithium silicate phase, the element Me reduces the area on which side reactions occur. The addition of the element Me suppresses side reactions of the lithium silicate and the silicon particles with the non-aqueous electrolyte, thus reducing the amount of gas generation.

The element Me also has the function of increasing the hardness of the lithium silicate phase. As a result of an increase in the hardness of the lithium silicate phase, cracking is less likely to occur in the matrix of the lithium silicate phase even when the silicon particles repeatedly undergo expansion and contraction during charge/discharge. Consequently, the structural stability of the negative electrode material LSX is further improved, and cracking of the particles of the negative electrode material LSX is suppressed, so that the charge/discharge cycle characteristics are also improved. Then, reactions between a newly generated surface and the non-aqueous electrolyte are reduced, and the gas generation is also further reduced.

The element Me may form a compound, and is contained in the lithium silicate phase in the state of an Me oxide, for example.

The amount of the element Me contained in the negative electrode material LSX can be determined using, as an index, an amount calculated assuming that the element Me forms a stoichiometric oxide (estimated Me oxide amount), regardless of the state of the element Me or the type of the Me compound. The estimated Me oxide amount is preferably 0.001 mass % or more and 1.0 mass % or less, relative to the total amount of the lithium silicate phase and the silicon particles. By setting the estimated Me oxide amount to 0.001 mass % or more, the effects of reducing the reaction area and increasing the hardness of the lithium silicate phase are increased. On the other hand, by setting the estimated Me oxide amount to 1.0 mass % or less, the reduction in the initial capacity can be minimized. The estimated Me oxide amount is preferably 0.005 mass % or more, relative to the total amount of the lithium silicate phase and the silicon particles.

The estimated Me oxide amount can be determined from the content of the element Me contained in the negative electrode material LSX. The content of the element Me is measured by entirely dissolving the sample in hot hydrofluoric-nitric acid (heated acid mixture of hydrofluoric acid and nitric acid), and removing the carbon in the dissolution residue by filtration, followed by analyzing the resulting filtrate by ICP-AES. A calibration curve is formed using a commercially available standard solution of the element Me, and the content of the element Me contained in the sample of the negative electrode material LSX is calculated.

The estimated Me oxide amount is calculated from the content of the element Me. For example, when the element Me is Y, the $Y_2O_3$ amount calculated assuming that all of the Y forms $Y_2O_3$ is the estimated yttrium oxide amount. When the element Me is Ca, the CaO amount calculated assuming that all of the Ca forms CaO is the estimated calcium oxide amount.

As the element Me, at least one selected from the group consisting of Y, Ce, Mg, and Ca is preferable. These elements are considered to have a significant effect in suppressing side reactions between the lithium silicate phase and the non-aqueous electrolyte. In particular, it is more preferable that Y is dispersed in the lithium silicate phase as an yttrium oxide ($Y_2O_x$), Ce as a cerium oxide ($CeO_x$), Ca as a calcium oxide ($CaO_x$), and Mg as a magnesium oxide ($MgO_x$).

The total amount of the yttrium oxide, the cerium oxide, the calcium oxide, and the magnesium oxide (estimated Me oxide amount) is preferably 0.015 mass % or more and 1.0 mass % or less, more preferably 0.05 mass % or more and 0.4 mass % or less, relative to the total amount of the lithium silicate phase and the silicon particles.

The lithium silicate phase may further include a compound of a third metal, in addition to Li, Si, O, and a rare-earth element. The compound of the third metal has the function of reducing the stress applied to the lithium silicate phase due to expansion and contraction of the silicon particles.

Examples of the compound of the third metal include metal oxides, metal carbides, metal nitrides, and metal borides. Preferred metal compounds are metal oxides and metal carbides. In particular, it is preferable to use at least one selected from the group consisting of zirconium oxide ($ZrO_2$), aluminum oxide ($Al_2O_3$), zirconium carbide (ZrC), tungsten carbide (WC), and silicon carbide (SiC)

From the viewpoint of improving the cycle characteristics, the compound of the third metal includes preferably at least one selected from the group consisting of zirconium oxide and aluminum oxide, particularly preferably zirconium oxide.

The amount of the compound of the third metal is preferably 0.005 mass % or more and 15 mass % or less, more preferably 0.01 mass % or more and 10 mass % or less, further preferably 0.01 mass % or more and 1 mass % or less, relative to the total amount of the lithium silicate phase and the silicon particles. As the amount of the compound of the third metal, an amount calculated assuming that the third metal forms a stoichiometric oxide may also be determined, as in the case of the content of the element Me.

When the compound of the third metal is dispersed in the lithium silicate phase, it is preferable that the element Me is dispersed in the compound of the third metal. In particular, when the element Me is dispersed in zirconium oxide, the effect of increasing the hardness of the lithium silicate phase to improve the structural stability of the negative electrode material LSX is further increased. For example, it is preferable that yttria-stabilized zirconia (YSZ) in which Y is dispersed in zirconium oxide is dispersed in the lithium silicate phase. At this time, the content of the Y element contained in YSZ is preferably 2 to 7 mol %, relative to the total amount of the Y element and the Zr element. In the case of using stabilized zirconia containing another element Me, the content of the element Me contained in the stabilized zirconia is also preferably 2 to 7 mol %, relative to the total amount of the element Me and the Zr element.

The compound of the third metal in which the compound of the element Me (e.g., an Me oxide) and the element Me are dispersed is dispersed in the lithium silicate phase in the form of fine particles. Hereinafter, the compound of the third metal in which the compound of the element Me and the element Me are dispersed is also referred to as particles containing the element Me. The compound of the third metal that does not contain the element Me is simply referred to as the compound of the third metal. It is preferable that the particles containing the element Me and the compound of the third metal are uniformly dispersed in the lithium silicate phase, as in the case of the silicon particles. The particles containing the element Me and the compound of the third metal have an average particle size of preferably 200 nm or less, particularly preferably 100 nm or less. When the average particle size is within the above-described range, a uniformly dispersed state of the particles containing the element Me and the compound of the third metal in the lithium silicate phase can be easily formed.

As in the case of the silicon particles, the average particle size of the particles containing the element Me or the compound of the third metal can be measured by observing a cross section of the negative electrode material LSX using a SEM or TEM image. Specifically, the average particle size can be determined by converting the areas of images of 100 particles containing the element Me or pieces of the compound of the third metal into the diameters of equivalent circles, and averaging the diameters.

It is preferable that the negative electrode material LSX forms a particulate material (also referred to as "LSX particles") having an average particle size of 1 to 25 μm, more preferably 4 to 15 μm. With the above-described range, the stress caused by a volume change of the negative electrode material LSX with charge/discharge can be more easily reduced, thus making it possible to easily achieve good cycle characteristics. The LSX particles also have an appropriate surface area, so that the capacity decrease caused by a side reaction with the non-aqueous electrolyte is also suppressed.

The average particle size of the LSX particles means a particle size (volume average particle size) with which an accumulated volume value is 50% in a particle size distribution measured by the laser diffraction/scattering method.

As the measurement apparatus, it is possible to use, for example, an "LA-750" manufactured by HORIBA, Ltd. (HORIBA).

Preferably, the LSX particles include a conductive material that coats at least a portion of the surfaces thereof. Due to the poor electronic conductivity of the lithium silicate phase, the conductivity of the LSX particles also tend to be low. The conductivity can be dramatically increased by coating the surfaces of the LSX particles with the conductive material. Preferably, the conductive layer has a thickness small enough not to substantially affect the average particle size of the LSX particles.

Next, a method for manufacturing the negative electrode material LSX will be described in detail.

Generally, the negative electrode material LSX is synthesized through two processes, namely, a pre-process of obtaining lithium silicate, and a post-process of obtaining a negative electrode material LSX from lithium silicate and a raw material silicon. The element Me may be added to the raw material of lithium silicate in the pre-process, but is preferably added in the post-process so as not to affect the synthesis of lithium silicate. More specifically, it is preferable that the method for manufacturing the negative electrode material LSX includes the steps of: (i) mixing silicon dioxide with a lithium compound, and firing the resulting mixture, to obtain lithium silicate; and (ii) forming a composite of the lithium silicate, a raw material silicon, and an element Me, to obtain a negative electrode material LSX including a lithium silicate phase, silicon particles dispersed in the lithium silicate phase, and the element Me dispersed in the lithium silicate phase.

Step (i)

The z value of the lithium silicate represented by the formula: $Li_{2z}SiO_{2+z}$ may be controlled using the atomic ratio: Li/Si of lithium to silicon in the mixture of silicon dioxide and the lithium compound. To synthesize good lithium silicate that causes less dissolution of the alkali component, Li/Si is preferably smaller than 1.

Lithium carbonate, lithium oxide, lithium hydroxide, lithium hydride, and the like can be used as the lithium compound. These may be used alone or in a combination of two or more.

It is preferable that the mixture including silicon dioxide and the lithium compound is heated in the air to 400° C. to 1200° C., preferably 800° C. to 1100° C., thus reacting the silicon dioxide with the lithium compound.

Step (ii)

Next, the formation of a composite of lithium silicate, the raw material silicon, and the element Me is performed. For example, a mixture of the lithium silicate, the raw material silicon, and the element Me may be ground while applying a shearing force to the mixture. As the raw material silicon, silicon coarse particles having an average particle size of several micrometers to several tens of micrometers may be used. Preferably, the resulting final silicon particles are controlled such that the crystallite size calculated from the half width of a diffraction peak attributed to the Si (111) plane in an XRD pattern using the Scherrer equation is 10 nm or more.

As the element Me used for preparation, an oxide, an oxalate, a nitrate, a sulfate, a halide, a carbonate, and the like of the element Me may be used. Among these, an Me oxide is preferable in that it is stable and has good ionic conductivity. More specific examples thereof include $CeO_2$, $Sc_2O_3$, $Y_2O_3$, $Er_2O_3$, $Tm_2O_3$, $Yb_2O_3$, and $Lu_2O_3$. Alternatively, a compound of a third element that contains the element Me, such as yttria-stabilized zirconia, may be used. These may be used alone or in a combination of two or more.

For example, lithium silicate, the raw material silicon, and an element Me (e.g., an Me oxide) may be mixed at a predetermined mass ratio, and the mixture may be stirred, while being pulverized using a grinding apparatus such as a ball mill. Note, however, that the process of forming a composite is not limited thereto. For example, silicon nanoparticles, lithium silicate nanoparticles, and an Me oxide may be synthesized without using a grinding apparatus, and these may be mixed.

Next, the pulverized mixture is heated to 450° C. to 1000° C., for example, in an inert atmosphere (e.g., in the atmosphere of argon, nitrogen, or the like), so that the mixture is fired. At this time, firing may be performed while applying a pressure to the mixture by hot pressing or the like, to produce a sintered body (negative electrode material LSX) of the mixture. Since lithium silicate is stable at 450° C. to 1000° C. and hardly reacts with silicon, it causes only a slight capacity decrease, if any.

Thereafter, the sintered body may be ground into a particulate, to form LSX particles. At this time, by appropriately selecting the grinding conditions, it is possible to obtain LSX particles having an average particle size of 1 to 25 µm, for example.

Step (iii)

Next, at least a portion of the surface of the LSX particles may be coated with a conductive material, to form a conductive layer. The conductive material is preferably electrochemically stable, and a carbon material is preferable. Examples of the method for coating the surface of the particulate material with a carbon material include the CVD method using a hydrocarbon gas such as acetylene or methane as the raw material, and a method involving mixing coal pitch, petroleum pitch, a phenol resin, or the like with the particulate material, and carbonizing the mixture by heating. Alternatively, carbon black may be attached to the surface of the particulate material.

In consideration of the securing of conductivity and the lithium ion diffusion, the thickness of the conductive layer is preferably 1 to 200 nm, more preferably 5 to 100 nm. The thickness of the conductive layer can be measured by observing a cross section of the particles using SEM or TEM.

Step (iv)

The process of washing the LSX particles with acid may be performed. For example, by washing the LSX particles with an acidic aqueous solution, a trace amount of a component, such as $Li_2SiO_3$, that can be produced when forming a composite of the raw material silicon and lithium silicate, can be dissolved and removed. As the acidic aqueous solution, it is possible to use an aqueous solution of an inorganic acid such as hydrochloric acid, hydrofluoric acid, sulfuric acid, nitric acid, phosphoric acid, and carbonic acid, or an aqueous solution of an organic acid such as citric acid and acetic acid.

FIG. 1 schematically shows a cross section of an LSX particle 20 as an example of the negative electrode material LSX.

The LSX particle 20 includes a lithium silicate phase 21, silicon particles 22 dispersed in the lithium silicate phase, and particles 25 containing an element Me dispersed in the lithium silicate phase. A conductive layer 24 is formed on the surface of a base particle 23 composed of the lithium silicate phase 21, the silicon particles 22, and the particles 25 containing the element Me. The conductive layer 24 is formed of a conductive material that coats at least a portion of the surface of the LSX particle or the base particle 23.

The base particle 23 has, for example, an island-in-the-sea structure in which fine silicon (simple substance of Si) particles 22 and fine particles 25 containing the element Me are substantially uniformly scattered in the matrix of the lithium silicate phase 21 on a given cross section, without being localized in a partial region. The particles 25 containing the element Me may be a compound of a third element that contains the element Me, such as an Me oxide and yttria-stabilized zirconia.

Preferably, the lithium silicate phase 21 is composed of particles that are finer than the silicon particles 22. In this case, in an X-ray diffraction (XRD) pattern of the LSX particle 20, the diffraction peak intensity attributed to the (111) plane of the simple substance of Si is greater than the diffraction peak intensity attributed to the (111) plane of the lithium silicate.

The base particle 23 may further include another component, in addition to the lithium silicate phase 21, the silicon particles 22 and the particles 25 containing the element Me, or the compound of the third metal. For example, the lithium silicate phase 21 may include, in addition to lithium silicate, $SiO_2$ in an amount corresponding to that of a natural oxide film formed on the surface of the silicon particles. Note, however, that the $SiO_2$ content in the base particle 23, as measured by Si-NMR, is preferably 30 mass % or less, more preferably 7 mass % or less, for example. It is preferable that substantially no peak of $SiO_2$ is observed at 20=25° in an XRD pattern obtained by XRD measurement.

Next, a non-aqueous electrolyte secondary battery according to an embodiment of the present invention will be described in detail. The non-aqueous electrolyte secondary battery includes, for example, a negative electrode, a positive electrode, and a non-aqueous electrolyte as described below.

[Negative Electrode]

The negative electrode includes, for example, a negative electrode current collector, and a negative electrode material mixture layer that is formed on the surface of the negative electrode current collector, and that includes a negative electrode active material. The negative electrode material mixture layer can be formed by applying, to the surface of the negative electrode current collector, a negative electrode slurry in which the negative electrode material mixture is dispersed in a dispersing medium, and drying the slurry. The coating film obtained after drying may be optionally rolled. The negative electrode material mixture layer may be formed on one surface of the negative electrode current collector, or may be formed on both surfaces thereof.

The negative electrode material mixture includes, as the negative electrode active material, a negative electrode material LSX (or LSX particles) as an essential component, and may include a binder, a conductive agent, a thickener, and the like as optional components. The silicon particles in the negative electrode material LSX can absorb a large amount of lithium ions, and thus contribute to an increase in the capacity of the negative electrode.

Preferably, the negative electrode active material further includes a carbon material that electrochemically absorbs and desorbs lithium ion. The negative electrode material LSX undergoes volume expansion and contraction due to charge/discharge, and, therefore, when the ratio thereof in the negative electrode active material increases, a contact failure between the negative electrode active material and the negative electrode current collector is likely to occur due to charge/discharge. On the other hand, by using the negative electrode material LSX and the carbon material in combination, it is possible to achieve excellent cycle characteristics, while providing the negative electrode with the high capacity of the silicon particles. The ratio of the negative electrode material LSX to the total amount of the negative electrode material LSX and the carbon material is preferably 3 to 30 mass %, for example. This makes it even easier to achieve both a high capacity and an improvement in cycle characteristics.

Examples of the carbon material include graphite, graphitizable carbon (soft carbon), and hardly graphitizable carbon (hard carbon). Among these, graphite is preferable because of the excellent stability of charge/discharge and the small irreversible capacity. Graphite means a material having a graphite crystal structure, and includes, for example, natural graphite, artificial graphite, and graphitized mesophase carbon particles. The carbon materials may be used alone or in a combination of two or more.

A non-porous conductive substrate (metal foil, etc.) or a porous conductive substrate (a mesh structure, a net structure, a punched sheet, etc.) is used as the negative electrode current collector. Examples of the material of the negative electrode current collector include stainless steel, nickel, a nickel alloy, copper, and a copper alloy. The thickness of the negative electrode current collector is, but is not particularly limited to, preferably 1 to 50 μm, more preferably 5 to 20 μm, in terms of the balance between the strength and the weight reduction of the negative electrode.

Examples of the binder include resin materials, including, for example, fluorocarbon resins such as polytetrafluoroethylene and polyvinylidene fluoride (PVDF); polyolefin resins such as polyethylene and polypropylene; polyamide resins such as aramid resin; polyimide resins such as polyimide and polyamide imide; acrylic resins such as polyacrylic acid, polymethyl acrylate, and ethylene-acrylic acid copolymers; vinyl resins such as polyacrylonitrile and polyvinyl acetate; polyvinyl pyrrolidone; polyether sulfone; and rubber-like materials such as styrene-butadiene copolymer rubber (SBR). These may be used alone or in a combination of two or more.

Examples of the conductive agent include carbon blacks such as acetylene black; conductive fibers such as carbon fiber and metal fiber; carbon fluoride; metal powders such as aluminum powder; conductive whiskers such as zinc oxide and potassium titanate; conductive metal oxides such as titanium oxide; and organic conductive materials such as a phenylene derivative. These may be used alone or in a combination of two or more.

Examples of the thickener include cellulose derivatives (cellulose ether, etc.), including, for example, carboxymethyl cellulose (CMC) and modified products thereof (also including salts such as a Na salt), and methylcellulose; saponified products of polymers having vinyl acetate units such as polyvinyl alcohol; and polyethers (polyalkylene oxides such as polyethylene oxide, etc.). These may be used alone or in a combination of two or more.

Examples of the dispersing medium include, but are not particularly limited to, water, alcohols such as ethanol, ethers such as tetrahydrofuran, amides such as dimethylformamide, N-methyl-2-pyrrolidone (NMP), or solvent mixtures thereof

[Positive Electrode]

The positive electrode includes, for example, a positive electrode current collector, and a positive electrode material mixture layer that is formed on the surface of the positive electrode current collector. The positive electrode material mixture layer can be formed by applying, to the surface of the positive electrode current collector, a positive electrode slurry in which the positive electrode material mixture is dispersed in a dispersing medium, and drying the slurry. The coating film obtained after drying may be optionally rolled. The positive electrode material mixture layer may be formed on one surface of the positive electrode current collector, or may be formed on both surfaces thereof.

A lithium composite metal oxide can be used as the positive electrode active material. Examples thereof include $Li_aCoO_2$, $Li_aNiO_2$, $Li_aMnO_2$, $Li_aCo_bNi_{1-b}O_2$, $Li_aCo_b$-$M_{1-b}O_c$, $Li_aNi_{1-b}M_bO_c$, $Li_aMn_2O_4$, $Li_aMn_{2-b}M_bO_4$, $LiMePO_4$, $Li_2MePO_4F$ (M is at least one of Na, Mg, Sc, Y, Mn, Fe, Co, Ni, Cu, Zn, Al, Cr, Pb, Sb, and B). Here, a=0 to 1.2, b=0 to 0.9, and C=2.0 to 2.3. Note that the value a, which represents the molar ratio of lithium, is a value obtained immediately after the fabrication of the active material, and increases or decreases through charge/discharge.

As the binder and the conductive agent, the materials given as the examples for the negative electrode can be used. As the conductive agent, graphite such as natural graphite or artificial graphite may be used.

The shape and the thickness of the positive electrode current collector can be respectively selected from the shape and the range corresponding to the negative electrode current collector. Examples of the material of the positive electrode current collector include stainless steel, aluminum, an aluminum alloy, and titanium.

[Non-Aqueous Electrolyte]

The non-aqueous electrolyte includes a non-aqueous solvent, and a lithium salt dissolved in the non-aqueous solvent. The concentration of the lithium salt in the non-aqueous electrolyte is, for example, 0.5 to 2 mol/L. The non-aqueous electrolyte may contain a known additive.

As the non-aqueous solvent, it is possible to use, for example, cyclic carbonic acid ester, chain carbonic acid ester, and cyclic carboxylic acid ester. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carbonic acid ester include γ-butyrolactone (GBL) and γ-valerolactone (GVL). The non-aqueous solvents may be used alone or in a combination of two or more.

As the lithium salt, it is possible to use, for example, lithium salts of chlorine-containing acid ($LiClO_4$, $LiAlCl_4$, $LiB_{10}Cl_{10}$, etc.), lithium salts of fluorine-containing acid ($LiPF_6$, $LiBF_4$, $LiSbF_6$, $LiAsF_6$, $LiCF_3SO_3$, $LiCF_3CO_2$, etc.), lithium salts of fluorine-containing acid imide ($LiN(CF_3SO_2)_2$, $LiN(CF_3SO_2)(C_4F_9SO_2)$, $LiN(C_2F_5SO_2)_2$, etc.), and lithium halides (LiCl, LiBr, LiI, etc.). The lithium salts may be used alone or in a combination of two or more.

[Separator]

Usually, it is desirable that a separator is interposed between a positive electrode and a negative electrode. The separator has a high ion permeability, and appropriate mechanical strength and insulating properties. As the separator, it is possible to use a microporous thin film, a woven fabric, a non-woven fabric, and the like. Polyolefins such as polypropylene and polyethylene are preferable as the material of the separator.

An exemplary structure of the non-aqueous electrolyte secondary battery includes a structure in which an electrode group formed by winding a positive electrode and a negative electrode with a separator interposed therebetween, and a non-aqueous electrolyte are housed in an outer case. Alternatively, an electrode group having another configuration, such as a stacked electrode group formed by stacking a positive electrode and a negative electrode with a separator interposed therebetween, may be applied in place of the wound electrode group. For example, the non-aqueous electrolyte secondary battery may have any of a cylindrical configuration, a square configuration, a coin configuration, a button configuration, and a laminated configuration.

Figure 2:
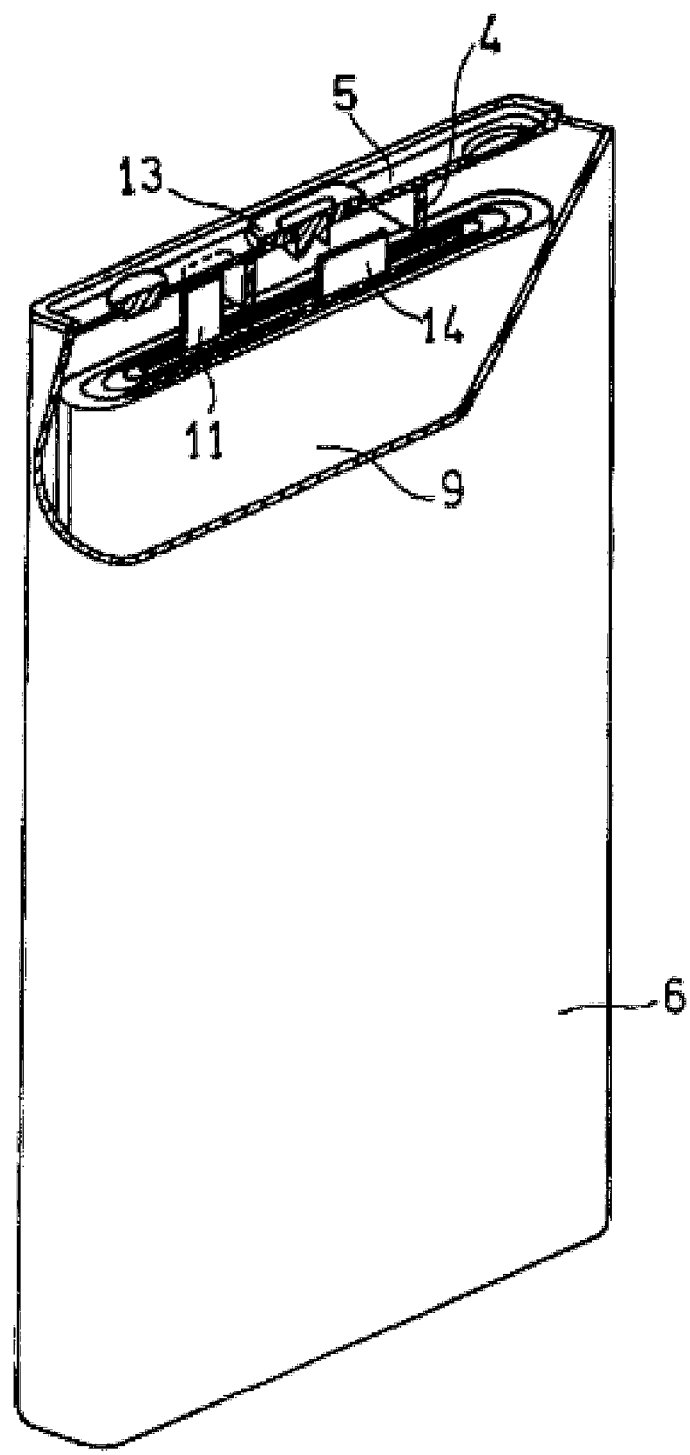
FIG. 2 is a partially cut-away schematic perspective view of a non-aqueous electrolyte secondary battery according to an embodiment of the present invention.

FIG. 2 is a partially cut-away schematic perspective view of a square non-aqueous electrolyte secondary battery according to an embodiment of the present invention.

The battery includes a square battery case 6 having a bottom, and an electrode group 9 and a non-aqueous electrolyte (not shown) that are housed in the battery case 6. The electrode group 9 includes a long ship-shaped negative electrode, a long ship-shaped positive electrode, and a separator that is interposed therebetween and prevents a direct contact therebetween. The electrode group 9 is formed by winding the negative electrode, the positive electrode, and the separator around a flat plate-shaped winding core, and pulling out the winding core.

An end of a negative electrode lead 11 is attached to a negative electrode current collector of the negative electrode through welding or the like. An end of a positive electrode lead 14 is attached to a positive electrode current collector of the positive electrode through welding or the like. The other end of the negative electrode lead 11 is electrically connected to a negative electrode terminal 13 provided on a sealing plate 5. The other end of the positive electrode lead 14 is electrically connected to the battery case 6 also serving as the positive electrode terminal. A resin frame body 4 that isolates the electrode group 9 and the sealing plate 5 from each other and also isolates the negative electrode lead 11 and the battery case 6 from each other is disposed at an upper portion of the electrode group 9. Then, an opening of the battery case 6 is sealed by the sealing plate 5.

Note that the non-aqueous electrolyte secondary battery may have a cylindrical structure, a coin-shaped structure, a button-shaped structure, or the like that includes a battery case made of metal, or may be a laminated battery including a battery case made of a laminated sheet, which is a laminate of a barrier layer and a resin.

Hereinafter, the present invention will be specifically described by way of examples and comparative examples. However, the present invention is not limited to the following examples.

Example 1

[Preparation of Negative Electrode Material LSX]

Step (i)

Silicon dioxide and lithium carbonate were mixed such that the atomic ratio: Si/Li was 1.05, and the mixture was fired at 950° C. in the air for 10 hours, to obtain lithium silicate represented by the formula: $Li_2Si_2O_5$ (z=0.5). The obtained lithium silicate was ground so as to have an average particle size of 10 μm.

Step (ii)

The lithium silicate ($Li_2Si_2O_5$) having an average particle size of 10 μm, a raw material silicon (3N, average particle size: 10 μm), and yttrium oxide ($Y_2O_3$) were mixed at a mass ratio of 50:50:0.0005. The mixture was filled into a pot (made of SUS, volume: 500 mL) of a planetary ball mill (P-5, manufactured by Fritsch Co., Ltd.), then 24 SUS balls (diameter 20 mm) were placed in the pot, and the cover was closed. Then, the mixture was ground in an inert atmosphere at 200 rpm for 50 hours.

Next, the mixture in the form of powder was taken out in the inert atmosphere, and was fired in the inert atmosphere at 800° C. for 4 hours in a state in which a pressure was applied thereto using a hot pressing machine, thus obtaining a sintered body (LSX particles (base particles)) of the mixture.

Thereafter, the LSX particles were ground, then passed through a mesh of 40 μm, and thereafter the particles were mixed with coal pitch (MCP 250, manufactured by JFE Chemical Corporation). Then, the mixture was fired in an inert atmosphere at 800° C., and the surface of each of the LSX particles was coated with a conductive carbon, to form a conductive layer. The coating amount of the conductive layer was 5 mass % to the total mass of the LSX particle and the conductive layer. Thereafter, using a sieve, LSX particles A1 including a conductive layer and having an average particle size of 5 μm were obtained.

[Analysis of LSX Particles]

An XRD analysis of the LSX particles A1 indicated that the crystallite size of the silicon particles calculated from the diffraction peak attributed to the Si (111) plane using the Scherrer equation was 15 nm.

As a result of analyzing the composition of the lithium silicate phase by the above-described methods (high-frequency induction heating furnace combustion-infrared absorption method, inert gas fusion-nondispersive infrared absorption method, and inductively coupled plasma emission spectrometry (ICP-AES)), the Si/Li ratio was 1.0, and the $Li_2Si_2O_5$ content measured by Si-NMR was 48 mass %.

An observation of a cross-sectional SEM photograph of an LSX particle A1 confirmed that, in the LSX particle A1, silicon particles having an average particle size of 50 nm and $Y_2O_x$ particles having a particle size of 10 nm to 1 μm were substantially uniformly dispersed in the matrix of $Li_2Si_2O_5$.

The diffraction peaks mainly attributed to the simple substance of Si and $Li_2Si_2O_5$ were confirmed in the XRD pattern of the LSX particle A1, and the peak intensities were such that Si>$Li_2Si_2O_5$. As a result of measuring the LSX particle A1 by Si-NMR, the $SiO_2$ content was 7 mass % or less.

The amount ($W_Y$) of yttrium oxide ($Y_2O_3$) to the total amount of the lithium silicate phase and the silicon particles, calculated from the feeding ratio was 0.0005 mass %.

[Fabrication of Negative Electrode]

The LSX particles A1 including a conductive layer and graphite were mixed at a mass ratio of 5:95, and the mixture was used as a negative electrode active material A1. The negative electrode active material A1, carboxymethyl cellulose sodium (CMC-Na), and styrene-butadiene rubber (SBR) were mixed at a mass ratio of 97.5:1:1.5, and water was added thereto. Thereafter, the mixture was stirred using a mixer (T.K. HIVIS MIX, manufactured by PRIMIX Corporation), to prepare a negative electrode slurry. Next, the negative electrode slurry was applied to the surface of a copper foil such that the mass of the negative electrode material mixture per $m^2$ of the copper foil was 190 g, and the coating film was dried, followed by rolling, to fabricate a negative electrode in which a negative electrode material mixture layer having a density of 1.5 $g/cm^3$ was formed on both surfaces of the copper foil.

[Fabrication of Positive Electrode]

Lithium cobaltate, acetylene black, and polyvinylidene fluoride were mixed at a mass ratio of 95:2.5:2.5, and N-methyl-2-pyrrolidone (NMP) was added thereto. Thereafter, the mixture was stirred using a mixer (T.K. HIVIS MIX manufactured by PRIMIX Corporation), to prepare a positive electrode slurry. Next, the positive electrode slurry was applied to the surface of an aluminum foil, and the coating film was dried, followed by rolling, to fabricate a positive electrode in which a positive electrode material mixture layer having a density of 3.6 $g/cm^3$ was formed on both surfaces of the aluminum foil.

[Preparation of Non-Aqueous Electrolytic Solution]

$LiPF_6$ was dissolved at a concentration of 1.0 mol/L in a solvent mixture including ethylene carbonate (EC) and diethyl carbonate (DEC) at a volume ratio of 3:7, to prepare a non-aqueous electrolytic solution.

[Fabrication of Non-Aqueous Electrolyte Secondary Battery]

A tab was attached to each of the electrodes, and the positive electrode and the negative electrode were spirally wound with a separator interposed therebetween such that the tabs were located at the outermost peripheral portion, to fabricate an electrode group. The electrode group was inserted into an outer case made of an aluminum laminate film, and the whole was vacuum dried at 105° C. for 2 hours. Thereafter, the non-aqueous electrolytic solution was injected into the outer case, and the opening of the outer case was sealed, to obtain a battery A1.

Examples 2 and 3

The $Y_2O_3$ amount ($W_Y$) to the total amount of the lithium silicate phase and the silicon particles, calculated from the feeding ratio was changed as shown in Table 1 by changing the mass of $Y_2O_3$ added per 100 parts by mass of the total amount of the lithium silicate and the raw material silicon in step (ii). Except for the foregoing, batteries A2 and A3 of Examples 2 and 3 were fabricated in the same manner as in Example 1.

Example 4

A battery A4 of Example 4 was fabricated in the same manner as in Example 1 except that lithium silicate, the raw material silicon, and yttria-stabilized zirconia (YSZ) were mixed at a mass ratio of 50:50:0.021, to obtain LSX particles A3 in step (ii). The mass ratio of yttrium oxide ($Y_2O_3$) and zirconium oxide ($ZrO_2$) in YSZ was 0.001:0.02, and the $Y_2O_3$ amount ($W_Y$) and the $ZrO_2$ amount ($W_Z$) to the total amount of the lithium silicate phase and the silicon particles, calculated from the feeding ratio were 0.001 mass % and 0.02 mass %, respectively.

Examples 5 to 11

The $Y_2O_3$ amount ($W_Y$) and the $ZrO_2$ amount ($W_Z$) to the total amount of the lithium silicate phase and the silicon particles, calculated from the feeding ratio were changed as shown in Table 1 by changing the YSZ amount added per 100 parts by mass of the total amount of the lithium silicate and the raw material silicon and the mass ratio of $Y_2O_3$ and $ZrO_2$ in YSZ in step (ii). Except for the foregoing, batteries A5 to A11 of Examples 5 to 11 were fabricated in the same manner as in Example 1.

Example 12

A battery A12 of Example 12 was fabricated in the same manner as in Example 5 except that ceria-stabilized zirconia was used in place of YSZ, and the $CeO_2$ amount ($W_{Ce}$) and the $ZrO_2$ amount ($W_Z$) to the total amount of the lithium silicate phase and the silicon particles, calculated from the feeding ratio were changed as shown in Table 1 in step (ii).

Example 13

A battery A13 of Example 13 was fabricated in the same manner as in Example 5 except that magnesia-stabilized zirconia was used in place of YSZ, and the MgO amount ($W_M$) and the $ZrO_2$ amount ($W_Z$) to the total amount of the lithium silicate phase and the silicon particles, calculated from the feeding ratio were changed as shown in Table 1 in step (ii).

Example 14

A battery A14 of Example 14 was fabricated in the same manner as in Example 5 except that calcia-stabilized zirconia was used in place of YSZ, and the CaO amount ($W_{Ca}$) and the $ZrO_2$ amount ($W_Z$) to the total amount of the lithium silicate phase and the silicon particles, calculated from the feeding ratio were changed as shown in Table 1 in step (ii).

Comparative Example 1

A battery B1 of Comparative Example 1 was fabricated in the same manner as in Example 1 except that $Y_2O_3$ was not used, and that lithium silicate ($Li_2Si_2O_5$) and the raw material silicon were mixed at a mass ratio of 50:50, to obtain LSX particles B1 in step (ii).

Comparative Example 2

A battery B2 of Comparative Example 2 was fabricated in the same manner as in Example 1 except that $Y_2O_3$ was not used, and that lithium silicate ($Li_2Si_2O_5$), the raw material silicon, and $ZrO_2$ were mixed at a mass ratio of 50:50:0.02, to obtain LSX particles B2 in step (ii).

Comparative Example 3

A battery B3 of Comparative Example 3 was fabricated in the same manner as in Example 1 except that $Y_2O_3$ was not used, and that lithium silicate ($Li_2Si_2O_5$), the raw material silicon, and $ZrO_2$ were mixed at a mass ratio of 50:50:3.6, to obtain LSX particles B3 in step (ii).

The batteries of Examples 1 to 14 and Comparative Examples 1 to 3 were evaluated by the following method. The results of the evaluation are shown in Table 1.

[Initial Charging Efficiency]
<Charging>
Constant current charging was performed with a current of 1 lt (800 mA) until the voltage reached 4.2 V, followed by constant voltage charging with a constant voltage of 4.2 V until the current reached ½₀ lt (40 mA).
<Discharging>
Constant current discharging was performed with a current of 1 lt (800 mA) until the voltage reached 2.75 V.

The rest period between charging and discharging was 10 minutes. The charge capacity at the 1st cycle obtained under the above-described charging/discharging conditions of each of the batteries is shown in Table 1 as the initial charge capacity. Note, however, that the initial charge capacities are shown as relative values, taking the initial charge capacity obtained for the battery B1 of the Comparative Example 1 as 100%.

[Gas Generation Amount]
A storage gas test using the Archimedean method was performed. That is, a fully charged battery was stored at 80° C. for 24 hours, and the amount of gas generated during the storage was calculated as the difference (unit: $cm^3$) between the volume before the storage and the volume after the storage of the battery. The gas generation amounts are shown as relative values in Table 1, taking the amount of gas generated for the battery B1 of Comparative Example 1 as 100%.

[Cycle Test]
In the above-described cycle test, the ratio of the discharge capacity at the 200th cycle to the discharge capacity at the 1st cycle was determined as the cycle retention rate. The cycle retention rates are shown as relative values in Table 1, taking the cycle retention rate obtained for the battery B1 of Comparative Example 1 as 100%.

It can be understood from Table 1 that, by dispersing the element Me in the lithium silicate phase, the gas generation amount is significantly reduced, resulting in a significant increase in the cycle retention rate. It can also be understood that, by dispersing the element Me in the lithium silicate phase using stabilized zirconia, the gas generation amount is

TABLE 1

| Battery | $Y_2O_3$ ($W_Y$) mass % | $CeO_2$ ($W_Y$) mass % | MgO ($W_Y$) mass % | CaO ($W_Z$) mass % | $ZrO_2$ ($W_Z$) mass % | Gas generation amount % (index) | Initial charge capacity % (index) | Cycle retention rate % (index) |
|---|---|---|---|---|---|---|---|---|
| B1 | 0 | 0 | 0 | 0 | 0 | 100 | 100 | 100 |
| B2 | 0 | 0 | 0 | 0 | 0.02 | 100 | 98 | 105 |
| B3 | 0 | 0 | 0 | 0 | 3.6 | 100 | 80 | 120 |
| A1 | 0.0005 | 0 | 0 | 0 | 0 | 95 | 100 | 102 |
| A2 | 0.001 | 0 | 0 | 0 | 0 | 90 | 100 | 105 |
| A3 | 0.3 | 0 | 0 | 0 | 0 | 71 | 97 | 120 |
| A4 | 0.001 | 0 | 0 | 0 | 0.02 | 85 | 98 | 130 |
| A5 | 0.01 | 0 | 0 | 0 | 0.2 | 75 | 95 | 140 |
| A6 | 0.05 | 0 | 0 | 0 | 1 | 70 | 90 | 155 |
| A7 | 0.15 | 0 | 0 | 0 | 2.7 | 65 | 85 | 165 |
| A8 | 0.3 | 0 | 0 | 0 | 3.6 | 60 | 80 | 175 |
| A9 | 1 | 0 | 0 | 0 | 10 | 55 | 65 | 180 |
| A10 | 1.2 | 0 | 0 | 0 | 12 | 55 | 60 | 180 |
| A11 | 1.5 | 0 | 0 | 0 | 15 | 55 | 55 | 180 |
| A12 | 0 | 0.01 | 0 | 0 | 0.2 | 76 | 95 | 138 |
| A13 | 0 | 0 | 0.01 | 0 | 0.2 | 77 | 95 | 136 |
| A14 | 0 | 0 | 0 | 0.01 | 0.2 | 78 | 95 | 135 | further significantly reduced, resulting in a further significant increase in the cycle retention rate.

INDUSTRIAL APPLICABILITY

With the negative electrode material LSX according to the present invention, it is possible to provide a non-aqueous electrolyte secondary battery in which the gas generation due to side reactions of a non-aqueous electrolyte is significantly reduced, and that has excellent cycle characteristics. The non-aqueous electrolyte secondary battery according to the present invention is useful as a main power supply for mobile communication devices, mobile electronic devices, and the like.

REFERENCE SIGNS LIST

4 . . . Frame body
5 . . . Sealing plate
6 . . . Battery case
9 . . . Electrode group
11 . . . Negative electrode lead
13 . . . Negative electrode terminal
14 . . . Positive electrode lead
20 . . . LSX particle
21 . . . Lithium silicate phase
22 . . . Silicon particles
23 . . . Base particle
24 . . . Conductive layer
25 . . . Particles containing element Me

The invention claimed is:

1. A negative electrode material for a non-aqueous electrolyte secondary battery, comprising:
a lithium silicate phase;
silicon particles dispersed in the lithium silicate phase; and
at least one element Me dispersed in the lithium silicate phase, and selected from the group consisting of a rare-earth element and an alkaline-earth metal.

2. The negative electrode material for a non-aqueous electrolyte secondary battery according to claim 1,
wherein the composition of the lithium silicate phase is represented by the formula: $Li_{2z}SiO_{2+z}$, and satisfies $0<z<2$.

3. The negative electrode material for a non-aqueous electrolyte secondary battery according to claim 1,
wherein the element Me is dispersed in the lithium silicate phase as an Me oxide, and
an amount of the Me oxide is 0.001 mass % or more and 1.0 mass % or less, relative to a total amount of the lithium silicate phase and the silicon particles.

4. The negative electrode material for a non-aqueous electrolyte secondary battery according to claim 3,
wherein the Me oxide includes at least one selected from the group consisting of an yttrium oxide, a cerium oxide, a calcium oxide, and a magnesium oxide.

5. The negative electrode material for a non-aqueous electrolyte secondary battery according to claim 1,
wherein the lithium silicate phase includes a zirconium oxide, and
the element Me is dispersed in the zirconium oxide.

6. The negative electrode material for a non-aqueous electrolyte secondary battery according to claim 5,
wherein the zirconium oxide has an average particle size of 200 nm or less.

7. The negative electrode material for a non-aqueous electrolyte secondary battery according to claim 1,
wherein the silicon particles have an average particle size of 200 nm or less before initial charging.

8. A non-aqueous electrolyte secondary battery comprising:
a negative electrode including the negative electrode material for a non-aqueous electrolyte secondary battery according to claim 1; a positive electrode capable of electrochemically absorbing and desorbing lithium; and a non-aqueous electrolyte.

* * * * *